United States Patent [19]

Kozikowski

[11] 4,431,261
[45] Feb. 14, 1984

[54] FIBER OPTIC SPLITTER

[75] Inventor: Carrie L. Kozikowski, Bedford, Va.

[73] Assignee: International Telephone and Telegraph Corporation, New York, N.Y.

[21] Appl. No.: 260,856

[22] Filed: May 6, 1981

[51] Int. Cl.³ .................................................. G02B 7/26
[52] U.S. Cl. ................................ 350/96.20; 350/96.15
[58] Field of Search ................ 350/96.15, 96.16, 96.20

[56] References Cited

U.S. PATENT DOCUMENTS

| 3,779,628 | 12/1973 | Kapron et al. | 350/96.15 |
| 3,912,362 | 10/1975 | Hudson | 350/96.20 |
| 4,065,203 | 12/1977 | Goell et al. | 350/96.20 |
| 4,076,378 | 2/1978 | Cole | 350/96.24 |
| 4,083,625 | 4/1978 | Hudson | 350/96.15 |
| 4,256,365 | 3/1981 | Lemesle et al. | 350/96.15 X |

FOREIGN PATENT DOCUMENTS 2805358  8/1979  Fed. Rep. of Germany ... 350/96.15

Primary Examiner—John D. Lee
Attorney, Agent, or Firm—John T. O'Halloran; Mary C. Werner

[57] ABSTRACT

An improved electro-optical device to multiple fiber splitter coupling arrangement comprising an electro-optical device having a light emitting region, a plurality of optical fibers each having a core and a cladding, the fibers being fused together and drawn to form a taper, the taper having a light receiving end, and means for securing the taper to the electro-optical device such that the light receiving end is optically coupled to the light emitting region.

5 Claims, 5 Drawing Figures

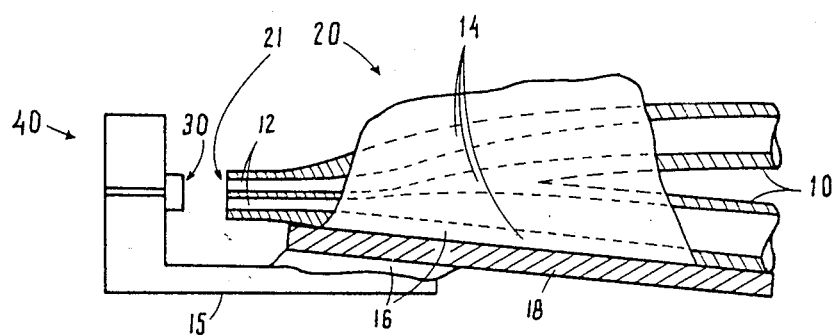
Fig. 1
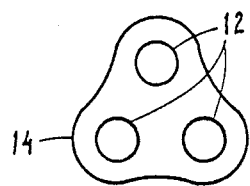
Fig. 2A
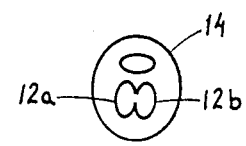
Fig. 2B
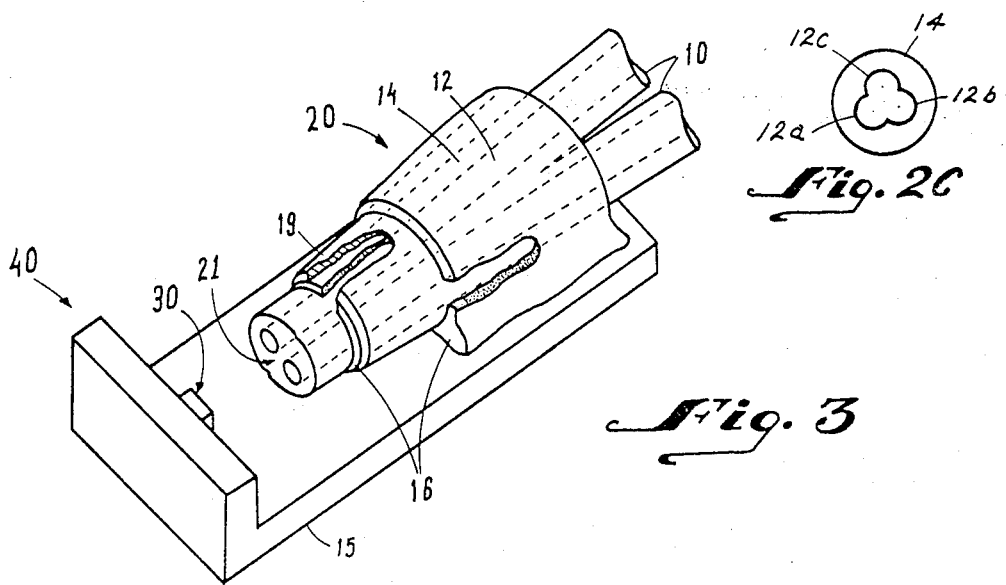
Fig. 2C
Fig. 3

FIBER OPTIC SPLITTER

BACKGROUND OF THE INVENTION

This invention relates to coupling an electro-optical device to an optical fiber splitter and more particularly, an arrangement which provides significantly reduced coupling losses and improved uniformity of the light power supplied to the optical fibers.

As is well known in the optical fiber field, it is desirable to couple optical fibers to electro-optical devices with a minimum loss of optical power. This objective has been the source of an extensive amount of research. Additionally, many attempts have been made to provide low loss fiber-to-fiber connections. Typically, the ends of the fibers to be connected are placed in close proximity. In this manner only a small amount of optical power is lost. A large number of methods and devices have been developed to facilitate the alignment of one optical fiber with another and to facilitate the mechanical connection of one fiber with another once they have been aligned. Additionally, a number of connectors are known which provide precision alignment of one fiber with another as the connector is secured around the fibers. These known aligning and connecting techniques have been primarily related to the connection of one fiber to another, whether as a single fiber connector or as discrete components of a cable connector.

It is occasionally necessary to connect a single optical fiber to a plurality of optical fibers. A device providing such a connection is commonly referred to as a splitter. Connections of this type present a substantially different set of problems than are encountered in the end-on connection of two single fibers. As is well known, an optical fiber generally consists of a core region where transmitted light is concentrated and a surrounding layer of a cladding material. In order to obtain optimum light transmission from one fiber to another, the core regions of the two fibers are placed in precision end-on alignment. This task is complicated when more than one fiber must be aligned with a single core region. One approach suggested in U.S. Pat. No. 4,083,625 involves scraping the cladding from the edges of the fibers which are to be adjacent one another. The core is then partially removed so that each fiber contributes a portion of the total core area. In one embodiment, the total core area of the fibers on one side of the splice equals the core area of a single fiber on the other side of the splice. Another splicing technique calls for the removal of the cladding from the end regions of the fibers being spliced. This provides a high ratio of core area to total cross section in the fiber bundle. This permits a greater portion of the light incident on the fiber bundle to enter the light transmitting core regions.

In a typical arrangement for providing a splice between a plurality of optical fibers and an electro-optical device such as for instance an LED, the plurality of fibers are spliced to a single fiber and this fiber is coupled to the LED. A variety of arrangements for coupling a fiber to an electro-optical device and the difficulties encountered in obtaining a minimum loss of optical power in such connections are described in U.S. Pat. No. 4,065,203. As may be appreciated, the complexity and loss of optical power associated with conventional electro-optical device to optical fiber splitter arrangements are undesirable.

SUMMARY OF THE INVENTION

In order to avoid the loss of optical power associated with conventional electro-optical device to optical fiber splitter coupling arrangements, an arrangement has been provided wherein the optical fiber between the splice and the electro-optical device is omitted. The ends of a plurality of fibers are fused and pulled in order to reduce the fiber diameter and to form a multi-fiber taper. At a location along the taper having the desired diameter, the fused fibers are scribed and broken. The resulting multi-fiber taper is secured to the electro-optical device in such a manner as to provide maximum optical coupling. The tapered shape of the fiber cores results in a magnifying effect since substantially all the light incident upon the multi-fiber bundle is ultimately directed to the fiber core regions. This is particularly effective when used in conjunction with graded index fiber although the invention is not so limited and would be of substantial value when used in conjunction with a step index fiber. A further benefit obtained by use of the invention is elimination of coupling losses associated with the extra splice required in conventional arrangements. Still further, the balancing of optical power propagated in the various fibers is superior to that obtained in other arrangements.

BRIEF DESCRIPTION OF THE DRAWING

FIG. 1 is an illustration of an electro-optical device to fiber optic splitter arrangement in accordance with the invention.

FIGS. 2A, 2B and 2C show cross-sectional views of portions of multi-fiber tapers.

FIG. 3 is a perspective view of an electro-optical device to fiber optic splitter arrangement in accordance with the invention.

DESCRIPTION OF THE PREFERRED EMBODIMENT

FIG. 1 shows the multi-fiber taper for use in providing an electro-optical device to multi-fiber splitter arrangement in accordance with the invention. A plurality of optical fibers 10 are fused to form a multi-fiber taper 20. The fibers are connected together preferably by fusing at high temperature. Formation of the taper is achieved by drawing the heated fibers to reduce their diameter. The core of the fibers has a taper diameter ratio of between about 10:1 and about 2:1. The length of a 3-fiber taper is less than about 1 inch.

The geometry of the tapered fiber bundle may be selected to correspond to the shape and size of the output region 30 of the electro-optical device. This selection of geometry is preferably made before the fibers are fused and drawn since any reforming of the tapered multi-fiber bundle may weaken the fibers. The selection of cross-sectional area of the fibers may be made after the multi-fiber taper is formed. By scribing and breaking at the appropriate location along the length of the taper, the desired cross-section may be obtained. FIG. 2A shows a preferred cross-section of the taper and FIGS. 2B and 2C show cross-sections where the core regions have been merged. Although merging of the cores is acceptable, it does not typically occur when clad fibers are simultaneously drawn during fusing. It is, however, fully within the scope of the invention disclosed herein. It has been found that the cross-sectional area of the cleaved taper should be larger than the area of the output portion 30 of the electro-optical device 40. This permits the taper to intercept the full optical power emitted from the electro-optical device. The core regions 12 of the taper may be actively aligned to balance the power entering the cores of the various fibers of the taper. This arrangement enhances the balancing of the optical power supplied to the fibers within the bundle. Such an arrangement also permits the optical output of the electro-optical device to be received, to the maximum extent possible, directly into the cores. The remaining portion of the optical output is received by the cladding layers 14 of the fibers. The tapered shape of the fibers enhances the recovery into the core region of the light received into the cladding. This is due to the increasing diameter of the core as the distance from the electro-optical device increases. This phenomenon is explained in U.S. Pat. No. 4,076,378. This magnification of optical power in the fiber cores results in a substantial reduction in the coupling loss from the electro-optical device to the plurality of optical fibers.

In order to demonstrate the improvement in optical power transmission which is achieved by use of this invention, the comparative data of transmission losses in a splitter according to the invention and a conventional splitter arrangement were obtained. It was found that a conventional splitter arrangement for a three-to-one splitter typically suffers a power loss of approximately 7 dB between the optical source and the branches of the splitter. In an arrangement constructed according to this invention, power loss was reduced to approximately 3 dB on the average. Losses of less than 2 dB have been achieved.

One manner of connection of the tapered bundle to the electro-optical device is shown in FIG. 1. The taper 20 is positioned such that the end face 21 is aligned with the output portion 30 of the electro-optical device 40 by known alignment techniques such as by use of an x, y, z positioner. When properly aligned, epoxy or adhesive or some other suitable material 16 is applied to secure the taper to the header 15 of the electro-optical device. A flat metal sheet 18 may be provided to aid in the proper alignment and securing of the taper to the electro-optical device. Such a plate 18 provides a firm base, or in an alternative arrangement a cover (not shown) for the taper and facilitates adjustment of taper location for ease of alignment. FIG. 3 illustrates the use of a tube 19 secured about the taper. In this arrangement the tube is secured to the header 15 by, for example, epoxy or adhesive.

While I have described above the principles of my invention in connection with specific apparatus, it is to be clearly understood that this description is made only by way of example and not as a limitation to the scope of my invention as set forth in the objects thereof and in the accompanying claims.

I claim:

1. An improved electro-optical device to multiple fiber splitter coupling arrangement comprising:
   an electro-optical device having a light emitting region,
   a multiple fiber splitter comprising a plurality of optical fibers each having a core and a cladding, said fibers being connected together with their claddings adjacent each other and having a tapered region so that the core diameter in the tapered region is less than the core diameter in the untapered region, said tapered region having a generally planar end face, the area of which is larger than the area of said light emitting device, said electro-optical device being positioned adjacent to said multiple fiber splitter with said light emitting region being directly adjacent to and separated from said generally planar end face so that light from said light emitting region is transmitted directly to said generally planar end face where it impinges on said cores for transmission along said fibers.

2. An electro-optical device to multiple fiber splitter arrangement as claimed in claim 1 wherein the core of said fibers has a taper diameter ratio of between about 10:1 and about 2:1.

3. An electro-optical device to multiple fiber splitter arrangement as claimed in claim 1 wherein a 3 fiber taper has a length of less than about 1 inch.

4. An electro-optical device to multiple fiber splitter arrangement as claimed in claim 1 further including a rigid plate positioned adjacent said multiple fiber splitter for positioning said splitter adjacent to said electro-optical device, said plate being held in position by one of an epoxy and an adhesive.

5. An electro-optical device to multiple fiber splitter arrangement as claimed in claim 1 further comprising a tube positioned around said multiple fiber splitter for positioning said splitter adjacent to said electro-optical device, said tube being held in position by one of an epoxy and an adhesive.

* * * * *